United States Patent
Ryll

(10) Patent No.: US 9,518,888 B2
(45) Date of Patent: Dec. 13, 2016

(54) METHOD FOR ASCERTAINING AN OFFSET OF AN OUTPUT SIGNAL OF AN EVALUATION CIRCUIT INTEGRATED IN A SENSOR, PREFERABLY OF A PRESSURE SENSOR INSTALLED IN A COMBUSTION CHAMBER OF AN INTERNAL COMBUSTION ENGINE, AND SENSOR

(71) Applicant: Robert Bosch GmbH, Stuttgart (DE)

(72) Inventor: Harald Ryll, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 226 days.

(21) Appl. No.: 14/397,905

(22) PCT Filed: Apr. 26, 2013

(86) PCT No.: PCT/EP2013/058764
§ 371 (c)(1),
(2) Date: Oct. 30, 2014

(87) PCT Pub. No.: WO2013/164273
PCT Pub. Date: Nov. 7, 2013

(65) Prior Publication Data
US 2015/0135798 A1   May 21, 2015

(30) Foreign Application Priority Data
May 2, 2012   (DE) .......... 10 2012 207 291

(51) Int. Cl.
*G01L 27/00* (2006.01)
*G01L 23/22* (2006.01)
(Continued)

(52) U.S. Cl.
CPC ........... *G01L 27/002* (2013.01); *F02B 77/085* (2013.01); *F02D 35/023* (2013.01); *F02D 41/28* (2013.01);
(Continued)

(58) Field of Classification Search
CPC ........ G01L 23/22; G01L 23/222; G01L 23/10; G01L 23/00; G01L 27/002; G01L 27/00; G01M 15/08; F02D 41/28; F02D 35/023; F02D 2041/285; F02D 2041/281; F02B 77/085; F02P 19/028
See application file for complete search history.

(56) References Cited

U.S. PATENT DOCUMENTS 4,377,851 A * 3/1983 McNamara ........... G01L 27/002
 702/98
4,800,513 A * 1/1989 Deutsch ................. G01K 1/026
 374/E1.005
(Continued)

FOREIGN PATENT DOCUMENTS

AT   DE 3632221 A1 *  4/1987  ............. G01D 3/063
EP   2 239 549         10/2010
(Continued)

OTHER PUBLICATIONS

International Search Report for PCT/EP2013/058764, dated Aug. 5, 2013.

*Primary Examiner* — Nguyen Ha
(74) *Attorney, Agent, or Firm* — Norton Rose Fulbright US LLP; Gerard Messina

(57) ABSTRACT

In a method for ascertaining an offset of an output signal of an evaluation circuit integrated in a sensor, the output signal is supplied to a control unit which analyzes the output signal, and a reset of the evaluation circuit for the adjustment of the output signal to a base level is performed prior to each measuring operation of the sensor, and the control unit ascertains the offset of the output signal of the evaluation circuit upon an occurrence of a start signal output by the evaluation circuit.

12 Claims, 2 Drawing Sheets

(51) Int. Cl.
  *G01M 15/08* (2006.01)
  *F02D 41/28* (2006.01)
  *F02D 35/02* (2006.01)
  *F02B 77/08* (2006.01)
  *F02P 19/02* (2006.01)

(52) U.S. Cl.
  CPC ............. *F02P 19/028* (2013.01); *G01L 23/22* (2013.01); *G01L 23/222* (2013.01); *G01M 15/08* (2013.01); *F02D 2041/281* (2013.01); *F02D 2041/285* (2013.01)

(56) References Cited

U.S. PATENT DOCUMENTS

| | | | |
|---|---|---|---|
| 6,456,954 B1* | 9/2002 | Ikuta | G01D 3/022 |
| | | | 702/108 |
| 2004/0183398 A1* | 9/2004 | Kashiwase | G01L 23/222 |
| | | | 310/319 |
| 2005/0062514 A1* | 3/2005 | Kashiwase | G01L 23/10 |
| | | | 327/307 |
| 2006/0032291 A1 | 2/2006 | Kashiwase et al. | |
| 2006/0086180 A1* | 4/2006 | Kassner | F02D 35/023 |
| | | | 73/114.18 |
| 2011/0030462 A1* | 2/2011 | Ramond | F02D 35/023 |
| | | | 73/114.16 |
| 2012/0060595 A1* | 3/2012 | Guwang | F02D 35/023 |
| | | | 73/114.18 |

FOREIGN PATENT DOCUMENTS

| | | | | |
|---|---|---|---|---|
| JP | H07 280686 | | 10/1995 | |
| JP | 2002364450 A | * | 12/2002 | ............. F02D 45/00 |

* cited by examiner

METHOD FOR ASCERTAINING AN OFFSET OF AN OUTPUT SIGNAL OF AN EVALUATION CIRCUIT INTEGRATED IN A SENSOR, PREFERABLY OF A PRESSURE SENSOR INSTALLED IN A COMBUSTION CHAMBER OF AN INTERNAL COMBUSTION ENGINE, AND SENSOR

BACKGROUND OF THE INVENTION

1. Field of the Invention

The present invention relates to a method for ascertaining an offset of an output signal of an evaluation circuit integrated in a sensor, preferably of a combustion chamber pressure sensor installed in a combustion chamber of an internal combustion engine, in which the output signal is supplied to a control unit that analyzes the output signal, and a reset of the evaluation circuit for an adjustment of the output signal to a basic level is performed prior to each measuring operation of the sensor.

2. Description of the Related Art

Sheathed-element glow plugs including a pressure sensor are in use today, which measures the cylinder pressure during the combustion of a fuel-air mixture in an internal combustion engine. Such sheathed-element glow plugs including the pressure sensor have an evaluation circuit, which is connected downstream from the pressure sensor in the sheathed-element glow plug. The pressure sensor operates on the basis of a piezoelectric measuring method, in which the detected pressure is converted into an electrical output signal, which is output and detected by an engine control unit. Because of the piezoelectric measuring method, the evaluation circuit connected downstream from the pressure sensor must be reset to the zero level with the aid of an internal algorithm prior to each combustion process, in order to avoid drift of the output signal.

As a result of the input-side electrical connection of the evaluation circuit of the pressure sensor, it can happen that the output signal exhibits an abrupt change to higher or lower voltage values following an internal reset. These abrupt changes are attributable to interference signals at the input of an integrator stage of the evaluation circuit at the instant immediately after the integrator resetting.

The signal jumps following the reset result in an offset shift of the entire pressure signal, and thus also of the output signal of the pressure sensor supplied as voltage, in the following cycle.

BRIEF SUMMARY OF THE INVENTION

The present invention is therefore based on the objective of providing a method for ascertaining an offset of an output signal of the evaluation circuit integrated into a sensor, in which the offset shift of the output signal following a reset is ascertained in a reliable manner.

According to the present invention, the objective is achieved in that the control unit determines the offset of the output signal of the evaluation circuit as a consequence of a start signal output by the evaluation circuit. Additional computing units in the evaluation circuit of the sensor are unnecessary because the offset is determined in the control unit, which has a cost-reducing effect. The ascertaining of the offset in the engine control unit takes place without any additional hardware outlay, because the means available in the engine control unit are employed for the software-based evaluation of the offset. In this way the offset of the output signal of the evaluation circuit can easily be determined by the engine control unit.

The start signal advantageously consists of a preferably brief application of a predefined level to the output signal of the evaluation circuit. To determine the offset of the output signal, the start signal is generated in the control unit and thus in an uncomplicated manner in the evaluation circuit.

In one development, the predefined level of the output signal corresponds to the level of the grounded connection of the evaluation circuit. The brief and simple pull-down of the existing level of the output signal to the level of the grounded connection signals to the control unit that a reset has taken place. In this way the control unit recognizes the reset at the correct instant and is able to carry out the offset determination.

In one variant, after receiving the start signal, the control unit calculates the offset in a defined time period, the time period being started immediately after the start signal is received, in particular. As a result, the offset of the output signal is calculated in the control unit in the particular time period during which the level of the output signal is connected to ground. The offset determination in the control unit disposed externally from the sensor is actively triggered solely by the sensor.

In one variant, the start signal is triggered by an internal reset of the evaluation circuit. No additional circuit element is required since this reset is already provided in the evaluation circuit.

In one further development, the defined time period is selected in such a way that a diagnosis of the output signal of the evaluation circuit performed in the control unit is not detected. Existing diagnoses in the control unit are therefore not adversely affected by the offset determination of the control unit.

The calculated offset is furthermore employed to correct a currently ascertained output signal of the evaluation circuit. The use of this corrected output signal therefore makes it possible to determine and further process the pressure actually arising during a combustion process in the combustion chamber of the internal combustion engine at any given time.

One further refinement of the present invention relates to a sensor, preferably a combustion chamber pressure sensor installed in a combustion chamber of an internal combustion engine; the sensor includes an evaluation circuit, which transmits an output signal to a control unit for analysis, and a reset of the evaluation circuit for an adjustment of the output signal to a base level is performed prior to each measuring operation of the sensor. A sensor which makes it possible to determine the offset of the output signal of the evaluation circuit in a reliable manner includes means that output to the control unit a start signal output by the evaluation circuit for ascertaining the offset of the output signal of the evaluation circuit. These means have simple circuits that require no higher intelligence comparable to a bus system.

The means advantageously include a switching circuit logic, which applies the start signal to an output of the evaluation circuit. This simple switching circuit logic can easily be inserted into an evaluation circuit developed as ASIC in the course of a sample revision.

In one variant, the switching circuit logic is developed as transistor. The use of a transistor allows a cost-effective development of the circuit, which can able be added to the evaluation circuit quite easily in terms of construction.

In one development, a flip-flop circuit for setting a defined time period for the offset determination is connected upstream from the switching circuit logic. The use of the flip-flop circuit for actuating the switching circuit logic in the evaluation circuit of the sensor results in active signaling to the control unit, which ascertains the offset after receiving these signals.

Another further refinement of the present invention relates to a control unit for ascertaining an offset of an output signal of an evaluation circuit integrated into a sensor, preferably of a combustion chamber pressure sensor installed in a combustion chamber of an internal combustion engine, which analyzes an output signal of the evaluation circuit. In a control unit that is able to ascertain an offset of the output signal of the evaluation circuit in an uncomplicated manner, means are provided which ascertain an offset of the output signal of the evaluation circuit after detecting a start signal output by the evaluation circuit of the sensor. This has the advantage that the offset determination function can be integrated into the software of the control unit without any need to provide additional hardware elements.

In one further specific embodiment, the means determine the offset in a time period that is specified by a duration of the occurrence of the start signal. The method of operation of the control unit is controlled by the active output of the reset by the evaluation circuit. The control unit requires no additional intelligence in this procedure.

The means, preferably a microprocessor, in particular correct a currently measured output signal of the evaluation circuit with the aid of the offset and supply the corrected output signal to the further evaluation. Because of this correction, the actual value of the pressure in the combustion chamber of the internal combustion engine measured by the sensor is always available for the further evaluation.

The present invention permits numerous specific embodiments. One of these embodiments will be explained in greater detail with reference to the figures shown in the drawing.

DETAILED DESCRIPTION OF THE INVENTION

Cold combustion engines, especially diesel engines, require starting assistance in igniting the fuel-air mixture introduced into the diesel engine at ambient temperatures of <40° C. Glow systems made up of sheathed-element glow plugs, a glow-time control unit and glow software stored in an engine control unit are used as starting aids.

Figure 1:
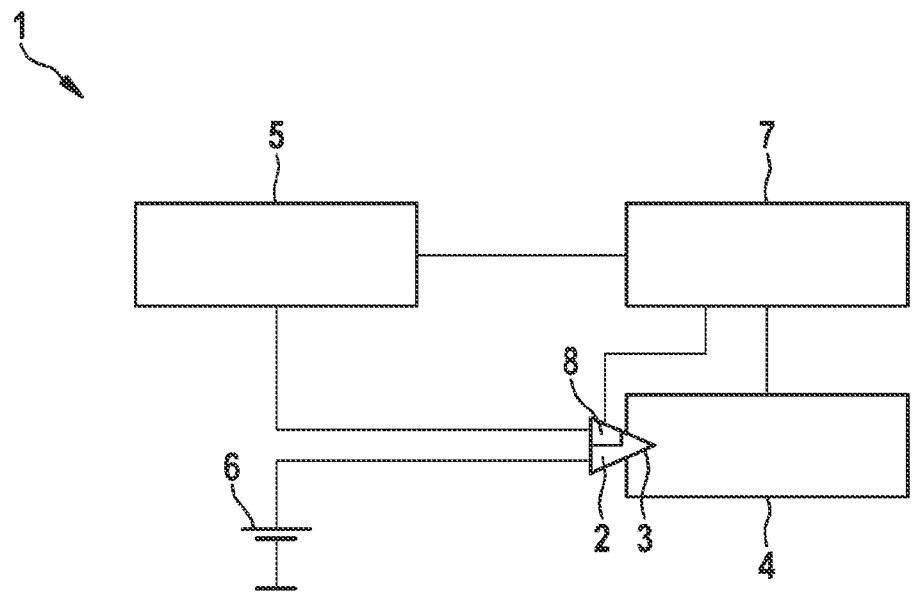
FIG. 1 shows a basic representation of the system of a sheathed-element glow plug in a combustion engine.

FIG. 1 schematically illustrates such a glow system 1. Sheathed element glow plug 2 projects into combustion chamber 3 of diesel engine 4. On one side, sheathed-element glow plug 2 is connected to glow-time control unit 5, and on the other side it leads to a vehicle system voltage 6, which actuates sheathed-element glow plug 2 using a nominal voltage of 4.4 or 7 Volt, for example. Glow-time control unit 5 is connected to engine control unit 7, which in turn leads to a diesel engine 4. In addition, a combustion chamber pressure sensor 8 is integrated into sheathed-element glow plug 2, which therefore likewise projects into combustion chamber 3 of diesel engine 4 and is connected to engine control unit 7. Combustion chamber pressure sensor 8 operates according to a piezoelectric measuring method, in which the pressure detected by combustion chamber pressure sensor 8 is converted into an electrical output signal that is detected by engine control unit 7.

Figure 2:
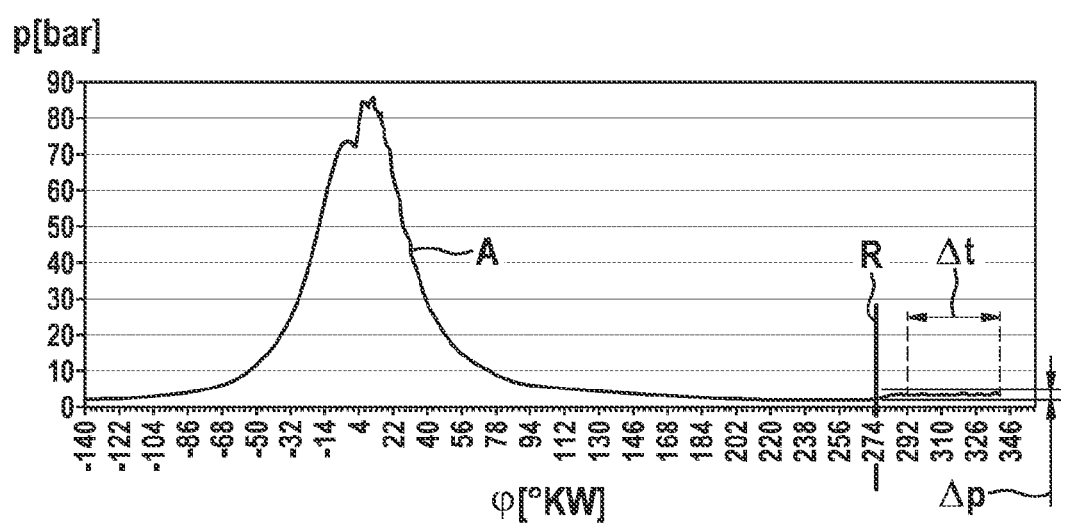
FIG. 2 shows an output signal of the evaluation circuit over a crankshaft angle range following an internal sensor reset.

FIG. 2 illustrates the characteristic of combustion chamber pressure p measured by combustion chamber pressure sensor 8 over a crankshaft angle range. Combustion chamber pressure p assumes a maximum in the combustion of the fuel-air mixture taking place in combustion chamber 3 of diesel engine 4 and then flattens again. Prior to each new measurement, an evaluation circuit 9 performs an internal reset R in combustion chamber pressure sensor 8, which causes an abrupt change in output signal A of evaluation circuit 9 integrated into combustion chamber pressure sensor 8, which is illustrated in FIG. 2 by $\Delta p$, that falsifies output signal A by this offset.

Figure 3:
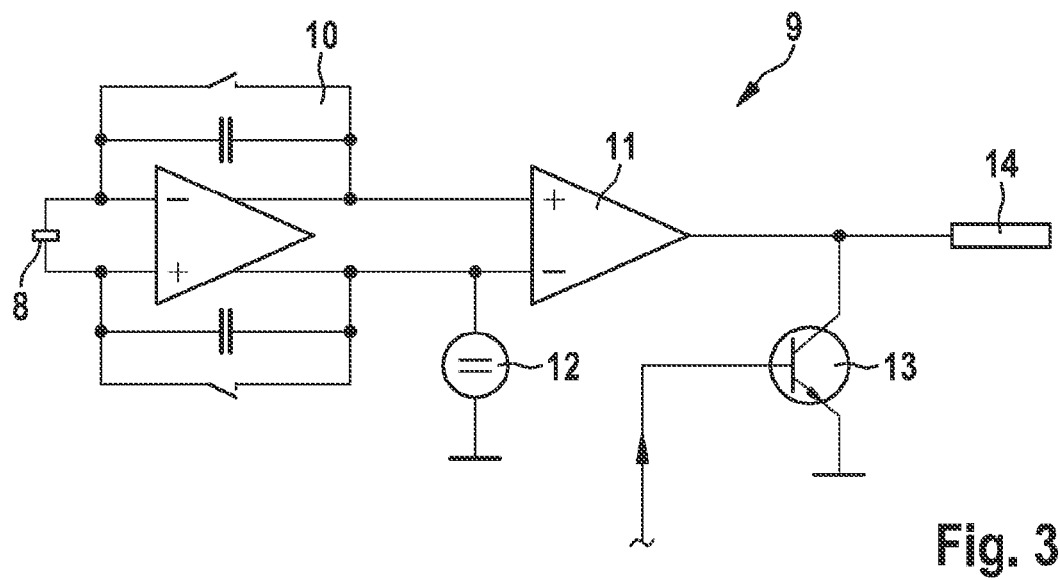
FIG. 3 shows a schematic representation of the evaluation circuit of the sensor.

Evaluation circuit 9 disposed in combustion chamber pressure sensor 8 is illustrated in FIG. 3. It follows combustion chamber pressure sensor 8 with a charge amplifier 10, which in turn is connected to a monoflop 11. A reference voltage 12 of 0.7 Volt, which is switched to ground, is present between charge amplifier 10 and monoflop 11, in an input of monoflop 11. Monoflop 11 leads to output 14 of evaluation circuit 9, where output signal A is tapped off by engine control unit 7. A transistor 13, which is triggered by charge amplifier 10, is situated between the output of monoflop 11 and output 14. Charge amplifier 10 includes a reset logic and sets the output signal of evaluation circuit 9 to ground prior to each new combustion that is to be detected by sheathed-element glow plug 2 and combustion chamber pressure sensor 8 in combustion chamber 3 of diesel engine 4. In this way the level of output signal A of evaluation circuit 9 drops for the period during which monoflop 11 is active. This brief pulldown of the level of output signal A is detected at output 14 by engine control unit 7 and evaluated as start signal for ascertaining the offset of output signal A of the evaluation circuit. During time period $\Delta t$, in which output signal A is switched to ground by transistor 13, engine control unit 7 starts the offset detection and, simultaneously, the offset compensation. The switching to ground causes no EMC interference whatsoever, since the level of output signal A at the switching instant is already very low (700 mV or less).

Because of the introduction of switching transistor 13 in evaluation circuit 9, which is developed as ASIC, output signal A of evaluation circuit 9 is related to ground in an uncomplicated manner. This switching instant takes place directly upon reset R of the integrator stage included in charge amplifier 10. Reset R is followed by defined time interval $\Delta t$, such as in the range of a few 10 μs. This time interval $\Delta t$ is defined by monoflop 11, which is likewise triggered by internal reset R.

Figure 4:
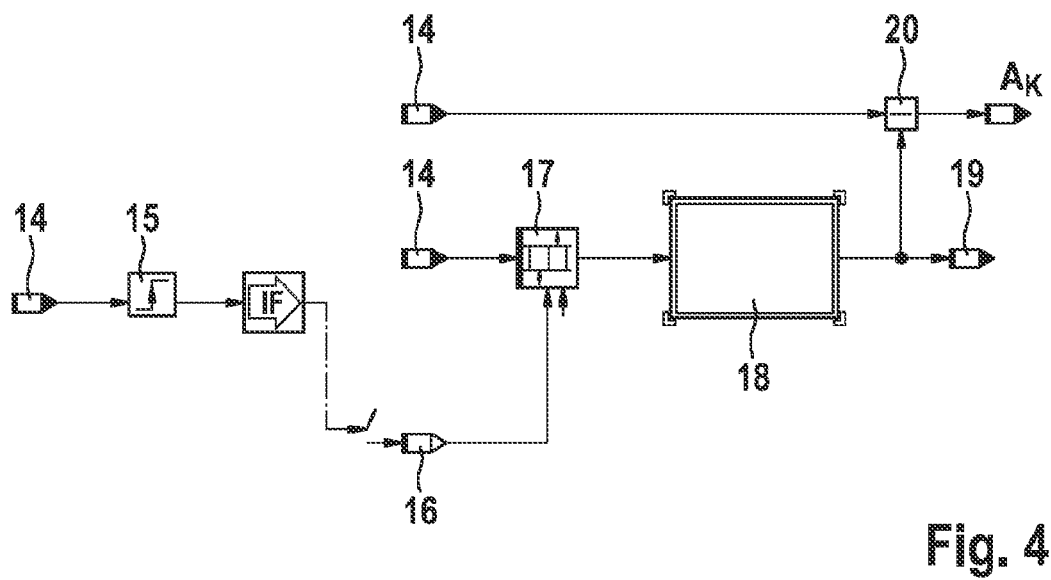
FIG. 4 shows a schematic sequence of the signal conditioning in a control unit.

The abrupt change of output signal A to ground generates a flank of output signal A at output 14 of evaluation circuit 9, which starts a counter 16 in engine control unit 7 (FIG. 4). Counter 16 counts a predefined number of signal values of output voltage A of evaluation circuit 9, which are written into an array 17. If the required number of signal values has been reached in array 17, then an average value is formed from the signal values stored in array 17 in an offset calculation 18 and compared with a nominal offset of 0.7

Volt, for example. The difference between the calculated average value and the nominal offset forms offset 19 of output signal A of evaluation circuit 9 that is caused by the abrupt change in output signal A. In point 20, this offset 19 is subtracted from output signal A currently applied at output 14 of evaluation circuit 9. Because of this subtraction, a corrected output signal $A_k$ is calculated in engine control unit 7, which corresponds to the pressure in combustion chamber 3 of diesel engine 4 actually measured by combustion chamber pressure sensor 8. Corrected output signal $A_k$ is then forwarded to the further evaluation.

By selecting the suitable time interval $\Delta t$ of the monoflop, which simultaneously corresponds to the offset evaluation period of engine control unit 7, it is possible that there will be no need to carry out a signal diagnosis "signal below minimum" in engine control unit 7. The proposed solution is therefore application-neutral. Diagnoses available in engine control unit 7 anyway remain unaffected by this method.

Because of reset R executed by evaluation circuit 9, engine control unit 7 detects the correct instant for determining the offset. A new offset is ascertained during time interval $\Delta t$, and this new offset is subtracted from the actual output signal A for the following remaining cycle.

What is claimed is:

1. A method for ascertaining an offset of an output signal of an evaluation circuit integrated in a combustion chamber pressure sensor, the combustion chamber pressure sensor projecting into a combustion chamber of an internal combustion engine, comprising:
    prior to each measuring operation of the sensor, resetting the evaluation circuit for adjusting the output signal to a base level;
    forwarding the output signal of the evaluation circuit to a control unit which analyzes the output signal;
    ascertaining by the control unit an offset of the output signal of the evaluation circuit upon an occurrence of a start signal output by the evaluation circuit; and
    correcting the output signal of the evaluation circuit using the calculated offset.

2. The method as recited in claim 1, wherein the start signal consists of an application of a predefined level of the output signal of the evaluation circuit.

3. The method as recited in claim 2, wherein the predefined level of the output signal corresponds to a level of a grounded connection of the evaluation circuit.

4. The method as recited in claim 2, wherein the control unit, after receiving the start signal, carries out the calculation of the offset within a predefined time period starting immediately after the receipt of the start signal.

5. The method as recited in claim 4, wherein the predefined time period is selected in such a way that a diagnosis of the output signal of the evaluation circuit running in the control unit is not detected.

6. The method as recited in claim 4, wherein the start signal is triggered by an internal reset of the evaluation circuit.

7. A combustion chamber pressure sensor system projecting into a combustion chamber of an internal combustion engine, comprising:
    an evaluation circuit which transmits an output signal to a control unit which analyzes the output signal, wherein the evaluation circuit performs, prior to each measuring operation of the sensor, an internal reset for adjusting the output signal to a base level; and
    a start signal unit which outputs to the control unit a start signal for ascertaining an offset of the output signal of the evaluation circuit.

8. The system as recited in claim 7, wherein the start signal unit includes a switching circuit logic which applies the start signal to an output of the evaluation circuit.

9. The system as recited in claim 8, wherein the switching circuit logic is a transistor.

10. The system as recited in claim 9, wherein a flip-flop circuit for adjusting a predefined time period for the offset determination is connected upstream from the switching circuit logic.

11. A control unit for ascertaining an offset of an output signal of an evaluation circuit integrated in a combustion chamber pressure sensor, the combustion chamber pressure sensor projecting into a combustion chamber of an internal combustion engine, comprising:
    a calculation unit including a processor configured to:
        ascertain an offset of the output signal of the evaluation circuit upon an occurrence of a start signal output by the evaluation circuit; and
        correct the output signal of the evaluation circuit using the calculated offset and supply the corrected output signal for a further evaluation.

12. The control unit as recited in claim 11, wherein the calculation unit ascertains the offset within a time period which is predefined by a duration of the occurrence of the start signal.

\* \* \* \* \*